United States Patent
Fukumine

(10) Patent No.: US 10,941,283 B2
(45) Date of Patent: Mar. 9, 2021

(54) NITRILE RUBBER COMPOSITION AND RUBBER CROSS-LINKED PRODUCT

(71) Applicant: ZEON CORPORATION, Tokyo (JP)

(72) Inventor: Yoshio Fukumine, Chiyoda-ku (JP)

(73) Assignee: ZEON CORPORATION, Tokyo (JP)

(*) Notice: Subject to any disclaimer, the term of this patent is extended or adjusted under 35 U.S.C. 154(b) by 22 days.

(21) Appl. No.: 16/084,709

(22) PCT Filed: Mar. 13, 2017

(86) PCT No.: PCT/JP2017/010001
§ 371 (c)(1),
(2) Date: Sep. 13, 2018

(87) PCT Pub. No.: WO2017/159623
PCT Pub. Date: Sep. 21, 2017

(65) Prior Publication Data
US 2019/0077938 A1    Mar. 14, 2019

(30) Foreign Application Priority Data
Mar. 18, 2016  (JP) .................................. 2016-054843

(51) Int. Cl.
| | |
|---|---|
| *C08L 83/04* | (2006.01) |
| *C08L 13/00* | (2006.01) |
| *C08K 3/36* | (2006.01) |
| *C09K 3/10* | (2006.01) |
| *C08K 5/5435* | (2006.01) |
| *C08K 5/544* | (2006.01) |
| *C08K 5/5419* | (2006.01) |
| *C08K 5/548* | (2006.01) |
| *C08L 33/18* | (2006.01) |
| *C08K 5/5425* | (2006.01) |
| *C08L 79/02* | (2006.01) |
| *F16L 11/04* | (2006.01) |

(52) U.S. Cl.
CPC ............. *C08L 13/00* (2013.01); *C08K 3/36* (2013.01); *C08K 5/544* (2013.01); *C08K 5/548* (2013.01); *C08K 5/5419* (2013.01); *C08K 5/5425* (2013.01); *C08K 5/5435* (2013.01); *C08L 33/18* (2013.01); *C08L 79/02* (2013.01); *C08L 83/04* (2013.01); *C09K 3/10* (2013.01); *C08L 2312/02* (2013.01); *F16L 11/04* (2013.01); *Y02P 20/54* (2015.11)

(58) Field of Classification Search
None
See application file for complete search history.

(56) References Cited

U.S. PATENT DOCUMENTS

| | | | | |
|---|---|---|---|---|
| 5,171,787 | A * | 12/1992 | Zama | C08L 21/00 525/100 |
| 2003/0236355 | A1 * | 12/2003 | Aimura | C08K 5/42 525/329.1 |
| 2005/0173371 | A1 * | 8/2005 | Zeni | B65D 39/0011 215/364 |
| 2009/0186977 | A1 * | 7/2009 | Nagamori | C08K 3/36 524/556 |
| 2010/0168302 | A1 * | 7/2010 | Nagamori | C08K 5/005 524/186 |
| 2011/0301300 | A1 * | 12/2011 | Iizuka | C08C 19/02 525/328.9 |
| 2013/0280459 | A1 | 10/2013 | Nakashima et al. | |
| 2014/0206250 | A1 * | 7/2014 | Nakashima | C09J 11/06 442/71 |
| 2015/0225618 | A1 * | 8/2015 | Sakamoto | C08J 5/124 428/519 |
| 2017/0166672 | A1 * | 6/2017 | Inoue | C08F 236/12 |

FOREIGN PATENT DOCUMENTS

| | | |
|---|---|---|
| JP | 2008-163074 A | 7/2008 |
| JP | 2012-149222 A | 8/2012 |
| JP | 2012-193294 A | 10/2012 |

OTHER PUBLICATIONS

Jul. 3, 2019 extended Search Report issued in European Patent Application No. 17766623.7.
May 23, 2017 International Search Report issued in International Patent Application PCT/JP2017/010001.
Sep. 18, 2018 International Preliminary Report on Patentability issued in International Patent Application PCT/JP2017/010001.

* cited by examiner

*Primary Examiner* — Robert S Loewe
(74) *Attorney, Agent, or Firm* — Oliff PLC

(57) ABSTRACT

A nitrile rubber composition including: a carboxyl group-containing nitrile rubber containing 5 to 30% by weight of an $\alpha,\beta$-ethylenically unsaturated nitrile monomer unit, 0.1 to 10% by weight of a carboxyl group-containing monomer unit, 15 to 60% by weight of an $\alpha,\beta$-ethylenically unsaturated monocarboxylic acid ester monomer unit, and 20 to 64.9% by weight of a conjugated diene monomer unit and having an iodine value of 120 or less; and a reactive silicone oil.

9 Claims, No Drawings

NITRILE RUBBER COMPOSITION AND RUBBER CROSS-LINKED PRODUCT

TECHNICAL FIELD

The present invention relates to a nitrile rubber composition capable of giving a cross-linked rubber having excellent compression set resistance, heat resistance, and cold resistance while maintaining normal physical properties (tensile strength and elongation at break) at a good level, and to a cross-linked rubber obtained using such a nitrile rubber composition.

BACKGROUND ART

Conventionally, nitrile rubber (acrylonitrile-butadiene copolymer rubber) has been used as a material for automobile rubber parts, such as hoses and tubes, by making use of its oil resistance, mechanical properties, chemical resistance, and the like. Further, hydrogenated nitrile rubber (hydrogenated acrylonitrile-butadiene copolymer rubber) obtained by hydrogenating the carbon-carbon double bond in the polymer main chain of the nitrile rubber also has excellent heat resistance, and hence is used for rubber parts such as seals, belts, hoses, and diaphragms.

As a composition of such a nitrile rubber, for example, Patent Document 1 discloses a nitrile rubber composition containing a carboxyl group-containing nitrile rubber and a reactive silicone oil.

RELATED ART

Patent Documents

Patent Document 1: Japanese Patent Laid-Open No. 2012-149222

SUMMARY OF THE INVENTION

Problem to be Solved by the Invention

In recent years, there is a need for further improvement in the performance of the material of rubber parts. For example, for the above-mentioned automobile rubber parts, in addition to further improvement in cold resistance, improvement in heat resistance is also desired. However, according to the technology of Patent Document 1, although a certain level of cold resistance is obtained, there are cases in which it is not possible to sufficiently meet the requirement for further improvement in cold resistance and the requirement for heat resistance.

The present invention has been made in view of such circumstances, and an object of the present invention is to provide a nitrile rubber composition capable of giving a cross-linked rubber having excellent compression set resistance, heat resistance, and cold resistance while maintaining normal physical properties (tensile strength and elongation at break) at a good level, and to provide a cross-linked rubber obtained using such a nitrile rubber composition.

Means for Solving the Problem

As a result of extensive research to achieve the above-mentioned object, the present inventor found that the above-mentioned object can be achieved by a nitrile rubber composition obtained by blending a reactive silicone oil with a carboxyl group-containing nitrile rubber containing a specific ratio of an $\alpha,\beta$-ethylenically unsaturated monocarboxylic acid ester monomer unit in addition to an $\alpha,\beta$-ethylenically unsaturated nitrile monomer unit, a carboxyl group-containing monomer unit, and a conjugated diene monomer unit, thereby completing the present invention.

Specifically, according to the present invention, there is provided a nitrile rubber composition including: a carboxyl group-containing nitrile rubber containing 5 to 30% by weight of an $\alpha,\beta$-ethylenically unsaturated nitrile monomer unit, 0.1 to 10% by weight of a carboxyl group-containing monomer unit, 15 to 60% by weight of an $\alpha,\beta$-ethylenically unsaturated monocarboxylic acid ester monomer unit, and 20 to 64.9% by weight of a conjugated diene monomer unit and having an iodine value of 120 or less; and a reactive silicone oil.

In the nitrile rubber composition according to the present invention, the reactive silicone oil preferably has at least one reactive group selected from the group consisting of a hydroxyl group, an amino group, a mercapto group, an epoxy group, a carboxyl group, an acryl group, and a methacryl group.

The nitrile rubber composition according to the present invention preferably further comprises silica.

The nitrile rubber composition according to the present invention preferably further comprises a polyamine cross-linking agent.

Further, according to the present invention, there is provided a cross-linked rubber obtained by cross-linking the above-mentioned nitrile rubber composition. This cross-linked rubber is preferably a seal material, a belt, a hose, or a gasket.

Effects of Invention

According to the present invention, there can be provided a rubber composition having excellent compression set resistance, heat resistance, and cold resistance while maintaining normal physical properties (tensile strength and elongation at break) at a good level, and a cross-linked rubber obtained by cross-linking such a nitrile rubber composition.

DESCRIPTION OF EMBODIMENTS

Nitrile Rubber Composition

The nitrile rubber composition of the present invention comprises: a carboxyl group-containing nitrile rubber containing 5 to 30% by weight of an $\alpha,\beta$-ethylenically unsaturated nitrile monomer unit, 0.1 to 10% by weight of a carboxyl group-containing monomer unit, 15 to 60% by weight of an $\alpha,\beta$-ethylenically unsaturated monocarboxylic acid ester monomer unit, and 20 to 64.9% by weight of a conjugated diene monomer unit and having an iodine value of 120 or less; and a reactive silicone oil.

Carboxyl Group-Containing Nitrile Rubber

First, the carboxyl group-containing nitrile rubber used in the present invention will be described. The carboxyl group-containing nitrile rubber used in the present invention is a rubber obtained by copolymerizing an $\alpha,\beta$-ethylenically unsaturated nitrile monomer, a carboxyl group-containing monomer, an $\alpha,\beta$-ethylenically unsaturated monocarboxylic acid ester monomer, a conjugated diene monomer, and another optionally-added monomer copolymerizable therewith.

The $\alpha,\beta$-ethylenically unsaturated nitrile monomer is not particularly limited as long as it is an $\alpha,\beta$-ethylenically unsaturated compound having a nitrile group. As the $\alpha,\beta$- ethylenically unsaturated nitrile monomer, for example, acrylonitrile; an α-halogenoacrylonitrile such as α-chloroacrylonitrile and α-bromoacrylonitrile; an α-alkylacrylonitrile such as methacrylonitrile, and the like, may be mentioned. Even among these, acrylonitrile and methacrylonitrile are preferable, and acrylonitrile is more preferable. These α,β-ethylenically unsaturated nitrile monomers can be used singly or in combinations of two or more.

The content of the α,β-ethylenically unsaturated nitrile monomer unit is, based on all the monomer units, 5 to 30% by weight, preferably 8 to 27% by weight, more preferably 10 to 25% by weight and further preferably 15 to 24.5% by weight. If the content of the α,β-ethylenically unsaturated nitrile monomer unit is too small, the cross-linked rubber to be obtained may have worse oil resistance, whereas if the content is too large, the cold resistance may deteriorate.

The carboxyl group-containing monomer is not particularly limited as long as it is a monomer that is copolymerizable with the α,β-ethylenically unsaturated nitrile monomer and has one or more unsubstituted (free) carboxyl group that is not esterified or the like. By using a carboxyl group-containing monomer, a carboxyl group can be introduced into the nitrile rubber.

As the carboxy group-containing monomer used in the present invention, α,β-ethylenically unsaturated monocarboxylic acid monomer, α,β-ethylenically unsaturated polyvalent carboxylic acid monomer, α,β-ethylenically unsaturated dicarboxylic acid monoester monomer, and the like, may be mentioned. Further, as the carboxyl group-containing monomer, a monomer in which the carboxyl group of these monomer forms a carboxylic acid salt may be included. In addition, an anhydride of α,β-ethylenically unsaturated polyvalent carboxylic acid can also be used as the carboxyl group-containing monomer, because the acid anhydride group is cleaved to form a carboxyl group after copolymerization.

As the α,β-ethylenically unsaturated monocarboxylic acid monomer, acrylic acid, methacrylic acid, ethylacrylic acid, crotonic acid, silicic acid, and the like, may be mentioned.

As the α,β-ethylenically unsaturated polyvalent carboxylic acid monomer, a butenedioic acid such as fumaric acid and maleic acid, itaconic acid, citraconic acid, mesaconic acid, glutaconic acid, allylmalonic acid, teraconic acid, and the like, may be mentioned. Further, as the anhydride of the α,β-unsaturated polyvalent carboxylic acid, maleic anhydride, itaconic anhydride, citraconic anhydride, and the like, may be mentioned.

As the α,β-ethylenically unsaturated dicarboxylic acid monoester monomer, a maleic acid monoalkyl ester such as monomethyl maleate, monoethyl maleate, monopropyl maleate, and mono n-butyl maleate; a maleic acid monocycloalkyl ester such as monocyclopentyl maleate, monocyclohexyl maleate, and monocycloheptyl maleate; a maleic acid monoalkyl cycloalkyl ester such as monomethylcyclopentyl maleate and monoethylcyclohexyl maleate; a fumaric acid monoalkyl ester such as monomethyl fumarate, monoethyl fumarate, monopropyl fumarate, and mono-n-butyl fumarate; a fumaric acid monocycloalkyl ester such as monocyclopentyl fumarate, monocyclohexyl fumarate, and monocycloheptyl fumarate; a fumaric acid monoalkyl cycloalkyl ester such as monomethylcyclopentyl fumarate and monoethylcyclohexyl fumarate; a citraconic acid monoalkyl ester such as monomethyl citraconate, monoethyl citraconate, monopropyl citraconate, and mono-n-butyl citraconate; a citraconic acid monocycloalkyl ester such as monocyclopentyl citraconate, monocyclohexyl citraconate, and monocycloheptyl citraconate; a citraconic acid monoalkyl cycloalkyl ester such as monomethylcyclopentyl citraconate and monoethylcyclohexyl citraconate; an itaconic acid monoalkyl ester such as monomethyl itaconate, monoethyl itaconate, monopropyl itaconate, and mono-n-butyl itaconate; an itaconic acid monocycloalkyl ester such as monocyclopentyl itaconate, monocyclohexyl itaconate, and monocycloheptyl itaconate; an itaconic acid monoalkyl cycloalkyl ester such as monomethylcyclopentyl itaconate and monoethylcyclohexyl itaconate; and the like, may be mentioned.

The carboxyl group-containing monomers may be used singly or in combinations of two or more. Even among these, because the effects of the present invention are exhibited in a much more remarkable manner, an α,β-ethylenically unsaturated dicarboxylic acid monoester monomer is preferable, a maleic acid monoester is more preferable, and a maleic acid monoalkyl ester is even more preferable. The alkyl group of the maleic acid monoalkyl ester preferably has 2 to 8 carbon atoms, and a mono n-butyl maleate having 4 carbon atoms is particularly preferable.

The content of the carboxyl group-containing monomer unit is, based on all the monomer units, 0.1 to 10% by weight, preferably 1 to 9% by weight, more preferably 2 to 8% by weight, and even more preferably 3 to 7% by weight. If the content of the carboxyl group-containing monomer unit is too small, the mechanical strength and compression set resistance of the cross-linked rubber to be obtained may deteriorate, whereas if the content is too large, the scorch stability of the nitrile rubber composition may deteriorate and the fatigue resistance of the cross-linked rubber to be obtained may deteriorate.

As the α,β-ethylenically unsaturated monocarboxylic acid ester monomer, a (meth)acrylic acid ester (an abbreviation for "methacrylic acid ester and acrylic acid ester", same below) having an alkyl group with 1 to 18 carbon atoms, such as methyl acrylate, ethyl acrylate, n-butyl acrylate, n-dodecyl acrylate, methyl methacrylate, and ethyl methacrylate; a (meth)acrylic acid ester having an alkoxyalkyl group with 2 to 12 carbon atoms, such as methoxymethyl acrylate, methoxyethyl acrylate, and methoxyethyl methacrylate; a (meth)acrylic acid ester having a cyanoalkyl group with 2 to 12 carbon atoms, such as α-cyanoethyl acrylate, α-cyanoethyl methacrylate, and α-cyanobutyl methacrylate; a (meth)acrylic acid ester having a hydroxyalkyl group with 1 to 12 carbon atoms, such as 2-hydroxyethyl acrylate, 2-hydroxypropyl acrylate, and 2-hydroxyethyl methacrylate; a (meth)acrylic acid ester having a fluoroalkyl group with 1 to 12 carbon atoms, such as trifluoroethyl acrylate and tetrafluoropropyl methacrylate; and the like, may be mentioned. Further, because the effects of the present invention are exhibited in a much more remarkable manner, a (meth)acrylic acid ester having an alkyl group with 1 to 18 carbon atoms and a (meth)acrylic acid ester having an alkoxyalkyl group with 2 to 12 carbon atoms are preferable, a (meth)acrylic acid ester having an alkyl group with 1 to 10 carbon atoms and a (meth)acrylic acid ester having an alkoxyalkyl group with 2 to 5 carbon atoms are more preferable, and n-butyl acrylate and methoxyethyl acrylate are particularly preferable. These may be used singly or in combinations of two or more.

The content of the α,β-ethylenically unsaturated monocarboxylic acid ester monomer unit is, based on the all the monomer units, 15 to 60% by weight, preferably 18 to 55% by weight, and more preferably 20 to 50% by weight. If the content of the α,β-ethylenically unsaturated monocarboxylic acid ester monomer unit is too small or too large, the cold resistance of the cross-linked rubber to be obtained may deteriorate.

In the nitrile rubber composition of the present invention, as the carboxyl group-containing nitrile rubber, a rubber having an α,β-ethylenically unsaturated monocarboxylic acid ester monomer unit in the above-mentioned proportion is used, and a reactive silicone oil is further used in combination therewith. As a result, the cross-linked rubber to be obtained can have excellent cold resistance while maintaining its normal physical properties at a good level (that is, while maintaining its tensile strength and elongation at break at a good level) and having excellent compression set resistance. In addition, the cross-linked rubber to be obtained also has improved heat resistance.

As the conjugated diene monomer forming the conjugated diene monomer unit, a conjugated diene monomer having 4 to 6 carbon atoms, such as 1,3-butadiene, isoprene, 2,3-dimethyl-1,3-butadiene, 1,3-pentadiene, and chloroprene is preferable, 1,3-butadiene or isoprene is more preferable, and 1,3-butadiene is particularly preferable. The conjugated diene monomers may be used singly or in combinations of two or more.

The content of the conjugated diene monomer unit is, based on all the monomer units, 20 to 64.9% by weight, preferably 25 to 60% by weight, and more preferably 30 to 50% by weight. If the content of the conjugated diene monomer unit is too small, the rubber elasticity of the cross-linked rubber to be obtained may deteriorate, whereas if the content is too large, the heat resistance and chemical stability may be impaired. In the case where later-described hydrogenation is carried out, the content of the conjugated diene monomer unit includes the hydrogenated portion.

Further, the carboxyl group-containing nitrile rubber used in the present invention may be one that is obtained by copolymerizing the α,β-ethylenically unsaturated nitrile monomer, the carboxyl group-containing monomer, the α,β-ethylenically unsaturated monocarboxylic acid ester monomer, and the conjugated diene monomer together with another monomer copolymerizable therewith. As such another monomer, ethylene, α-olefin monomer, aromatic vinyl monomer, fluorine-containing vinyl monomer, copolymerizable antiaging agent, and the like, may be mentioned.

As The α-olefin monomer, one having 3 to 12 carbon atoms is preferable, for example, propylene, 1-butene, 4-methyl-1-pentene, 1-hexene, 1-octene, and the like, may be mentioned.

As the aromatic vinyl monomer, for example, styrene, α-methylstyrene, vinylpyridine, and the like, may be mentioned.

As the fluorine-containing vinyl monomer, for example, fluoroethylvinyl ether, fluoropropylvinyl ether, o-trifluoromethyl styrene, vinyl pentafluorobenzoate, difluoroethylene, tetrafluoroethylene, and the like, may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like, may be mentioned.

These copolymerizable other monomers may also be used in combinations of two or more. The content of the unit of the other monomer is, based on all the monomer units, preferably 40% by weight or less, more preferably 30% by weight or less, and even more preferably 10% by weight or less.

The carboxyl group-containing nitrile rubber has an iodine value of 120 or less, preferably 60 or less, more preferably 40 or less, even more preferably 30 or less, and particularly preferably 15 or less. By setting the iodine value to 120 or less, the heat resistance and the ozone resistance of the cross-linked rubber to be obtained can be improved.

The carboxyl group-containing nitrile rubber has a polymer Mooney viscosity (ML1+4, 100° C.) of preferably 10 to 200, more preferably 15 to 150, even more preferably 15 to 100, and particularly preferably 30 to 70. If the carboxyl group-containing nitrile rubber has a polymer Mooney viscosity that is too low, the mechanical properties of the cross-linked rubber to be obtained tend to deteriorate, whereas if the Mooney viscosity is too high, the processability of the nitrile rubber composition may deteriorate.

Further, in the carboxyl group-containing nitrile rubber, the carboxyl group content, that is, the number of moles of carboxyl groups per 100 g of the carboxyl group-containing nitrile rubber, is preferably $5\times10^{-4}$ to $5\times10^{-1}$ ephr, more preferably $1\times10^{-3}$ to $1\times10^{-1}$ ephr, even more preferably $5\times10^{-3}$ to $6\times10^{-2}$ ephr, and particularly preferably $2\times10^{-2}$ to $5\times10^{-2}$ ephr. If the carboxyl group content of the carboxyl group-containing nitrile rubber is too low, the mechanical strength of the cross-linked rubber to be obtained tend to deteriorate, whereas if the carboxyl group content is too high, the cold resistance may deteriorate.

The method of producing the carboxyl group-containing nitrile rubber used in the present invention is not particularly limited, but it is preferable to produce it by using emulsion polymerization using an emulsifying agent so as to copolymerize the above-mentioned monomers to prepare a latex of copolymer rubber and then hydrogenate this. At the time of the emulsion polymerization, secondary polymerization materials that are usually used, such as an emulsifying agent, a polymerization initiator, a molecular weight adjuster, and the like, may be used.

As the emulsifying agent, it is not particularly limited, but, for example, a nonionic emulsifying agent such as polyoxyethylene alkyl ether, polyoxyethylene alkylphenol ether, polyoxyethylene alkyl ester, and polyoxyethylene sorbitan alkyl ester; an anionic emulsifying agent such as a salt of a fatty acid, such as myristic acid, palmitic acid, oleic acid, and linoleic acid, an alkylbenzene sulfonate, such as sodium dodecylbenzene sulfonate, a higher alcohol sulfate, and alkyl sulfosuccinate; a copolymerizable emulsifying agent such as a sulfoester of an α,β-unsaturated carboxylic acid, a sulfate ester of an α,β-unsaturated carboxylic acid, sulfoalkyl arylether; and the like, may be mentioned. The amount of the emulsifying agent used is preferably 0.1 to 10 parts by weight with respect to 100 parts by weight of all the monomers.

The polymerization initiator is not particularly limited as long as it is a radical initiator. As examples thereof, an inorganic peroxide such as potassium persulfate, sodium persulfate, ammonium persulfate, potassium perphosphate, and hydrogen peroxide; an organic peroxide such as t-butyl peroxide, cumen hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; an azo compound such as azobisisobutyronitrile, azobis-2,4-dimethyl valeronitrile, azobiscyclohexane carbonitrile, and methyl azobisisobutyrate; and the like, may be mentioned. These polymerization initiators may be used singly or in combinations of two or more. As the polymerization initiator, an inorganic or organic peroxide is preferable. When a peroxide is used as the polymerization initiator, it may be used together with a reducing agent, such as sodium hydrogen sulfite and ferrous sulfate as a redox polymerization initiator. The amount of the polymerization initiator used is preferably 0.01 to 2 parts by weight with respect to 100 parts by weight of all the monomers.

As the molecular weight adjuster, it is not particularly limited, a mercaptan such as t-dodecyl mercaptan, n-dodecyl mercaptan, and octyl mercaptan; a halogenated hydrocarbon such as carbon tetrachloride, methylene chloride, and methylene bromide; an α-methylstyrene dimer; a sulfur-containing compound such as tetraethylthiuram disulfide, dipentamethylene thiuram disulfide, and diisopropyl xanthogen disulfide; and the like, may be mentioned. These may be used singly or in combinations or two or more. Even among these, a mercaptan is preferable, and t-dodecyl mercaptan is more preferable. The amount of the molecular weight adjuster used is preferably 0.1 to 0.8 parts by weight with respect to 100 parts by weight of all the monomers.

For the medium for the emulsion polymerization, usually water is used. The amount of water is preferably 80 to 500 parts by weight with respect to 100 parts by weight of all the monomers.

At the time of the emulsion polymerization, a secondary polymerization material, such as a stabilizer, a dispersant, a pH adjuster, a deoxidant, a particle size adjuster, and the like, may be used optionally. In the case of using these, the type and the amount used are not particularly limited.

When the copolymer obtained by copolymerization has an iodine value higher than 120, the copolymer may be hydrogenated (subjected to a hydrogen addition reaction) so as to make the iodine value 120 or less. In this case, the hydrogenation method is not particularly limited, and a known method may be employed.

Reactive Silicone Oil

The reactive silicone oil used in the present invention is a silicone oil having a reactive group. According to the present invention, a rubber having an α,β-ethylenically unsaturated monocarboxylic acid ester monomer unit in the specific proportion described above is used as the carboxyl group-containing nitrile rubber, and the reactive silicone oil is used in combination therewith. As a result, the cross-linked rubber to be obtained can have excellent cold resistance while maintaining its normal physical properties at a good level (while maintaining its tensile strength and elongation at break at a good level) and having excellent compression set resistance. In addition, the cross-linked rubber to be obtained also has improved heat resistance. In particular, according to the present invention, by using the above-mentioned carboxyl group-containing nitrile rubber having an α,β-ethylenically unsaturated monocarboxylic acid ester monomer unit and a reactive silicone oil in combination, when blended with a filler such as silica, it is possible to have a good affinity with the filler such as silica, and as a result, in particular, when blended with a filler such as silica, such effects can be enhanced.

The reactive group contained in the reactive silicone oil used in the present invention is preferably a functional group capable of reacting with the carboxyl group in the above-mentioned carboxyl group-containing nitrile rubber. The reactive group is preferably at least one group selected from the group consisting of a hydroxyl group, an amino group, a mercapto group, an epoxy group, a carboxyl group, an acryl group (—OOC—CH=CH$_2$, where —OOC— represents an oxycarbonyl group), and a methacryl group (—OOC—C(CH$_3$)=CH$_2$, where —OOC— represents an oxycarbonyl group). Even among those, an amino group, an epoxy group, and a mercapto group are more preferable, and an amino group is particularly preferable. The epoxy group may be any group having an oxirane ring, and is not particularly limited. For example, in addition to one which has a oxirane ring in a linear chain hydrocarbon group, one which has an oxirane ring in a cyclic hydrocarbon group may also be used.

As the reactive silicone oil used in the present invention, for example, a compound represented by the following general formula (1), the following general formula (2), the following general formula (3), the following general formula (4), the following general formula (5), or the following general formula (6) may be used. Even among these, a compound represented by the following general formula (1) or the following general formula (2) is preferable, and a compound represented by the following general formula (2) is more preferable. From the points of the high reactivity and the ability to act well as a cross-linking agent when blended with a nitrile rubber composition, among the compound represented by the following formula (2), compound represented by the following formula (6) are particularly preferable.

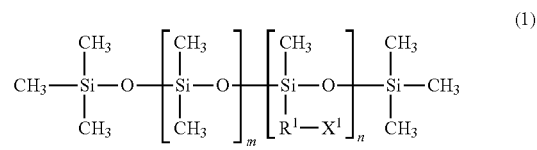

(In the above formula (1), $R^1$ is a hydrocarbon group having 1 to 30 carbon atoms, preferably having 1 to 10 carbon atoms that may have a heteroatom in a main chain and/or a side chain; $X^1$ is any one of the above-mentioned reactive groups; "m" is an integer of 1 to 10,000; and "n" is an integer of 1 to 10,000.)

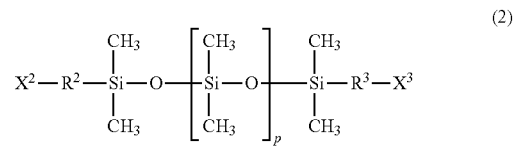

(In the above formula (2), $R^2$ and $R^3$ each independently represent a hydrocarbon group having 1 to 30 carbon atoms, preferably having 1 to 10 carbon atoms that may have a heteroatom in a main chain and/or a side chain; $X^2$ and $X^3$ are each independently any one of the above-mentioned reactive groups; "p" is an integer of 1 to 10,000; $R^2$ and $R^3$ may be the same or different from each other; and $X^2$ and $X^3$ may be the same or different from each other.)

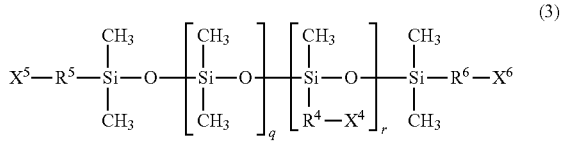

(In the above formula (3), $R^4$, $R^5$, and $R^6$ each independently represent a hydrocarbon group having 1 to 30 carbon atoms, preferably having 1 to 10 carbon atoms that may have a heteroatom in a main chain and/or a side chain; $X^4$, $X^5$, and $X^6$ are each independently any one of the above-mentioned reactive groups; "q" is an integer of 1 to 10,000; "r" is an integer of 1 to 10,000; $R^4$, $R^5$, and $R^6$ may be the same or different from each other; and $X^4$, $X^5$, and $X^6$ may be the same or different from each other.)

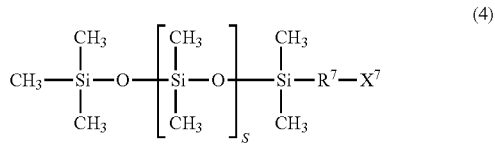

(4)

(In the above formula (4), $R^7$ is a hydrocarbon group having 1 to 30 carbon atoms, preferably having 1 to 10 carbon atoms that may have a heteroatom in a main chain and/or a side chain; $X^7$ is any one of the above-mentioned reactive groups; and "s" is an integer of 1 to 10,000;

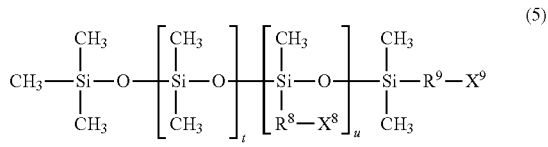

(5)

(In the above formula (5), $R^8$ and $R^9$ each independently represent a hydrocarbon group having 1 to 30 carbon atoms, preferably having 1 to 10 carbon atoms that may have a heteroatom in a main chain and/or a side chain; $X^8$ and $X^9$ are each independently any one of the above-mentioned reactive groups; "t" is an integer of 1 to 10,000; "u" is an integer of 1 to 10,000; $R^8$ and $R^9$ may be the same or different from each other; and $X^8$ and $X^9$ may be the same or different from each other.)

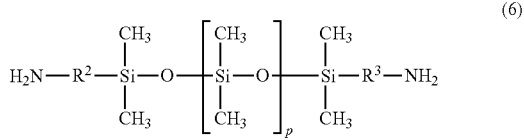

(6)

(In the above formula (6), $R^2$, $R^3$, and "p" are as defined above in formula (2).)

When $R^1$, $R^2$, $R^3$, $R^4$, $R^5$, $R^6$, $R^7$, $R^8$ and/or $R^9$ have a heteroatom in the main chain and/or side chain, as the heteroatom, an oxygen atom, a sulfur atom, and a nitrogen atom are preferable, and an oxygen atom is particularly preferable.

The reactive silicone oil represented by formula (1) is a side-chain-type reactive group-modified silicone oil having a reactive group in a side chain. The reactive silicone oil represented by formula (2) and formula (6) is a both-end-type reactive group-modified silicone oil having a reactive group at both ends. The reactive silicone oil represented by formula (3) is a side-chain and both-end-type reactive group-modified silicone oil having a reactive group in a side chain and at both ends. The reactive silicone oil represented by formula (4) is a one-end-type reactive group-modified silicone oil having a reactive group at one end. The reactive silicone oil represented by formula (5) is a side-chain and single-end-type reactive group-modified silicone oil having a reactive group in a side chain and at one end.

The reactive silicone oil represented by the above formula (1) is commercially available as the product names "KF-868", "KF-859", "KF-102", "KF-1001", "KF-2001", "X-22-3701E", "X-22-4741", and "X-22-343" (all manufactured by Shin-Etsu Chemical Co., Ltd.), and the like, and a commercially-available product such as these may be used. The reactive silicone oil represented by the above formula (2) is commercially available as the product names "X-22-161B", "X-22-162C", "X-22-163B", "X-22-164B", "X-22-167B", "X-22-169B", and "X-22-4952" (all manufactured by Shin-Etsu Chemical Co., Ltd.), and the like, and a commercially-available product such as these may be used. The reactive silicone oil represented by the above formula (3) is commercially available as the product names "KF-857" and "X-22-9002" (both manufactured by Shin-Etsu Chemical Co., Ltd.), and the like, and a commercially-available product such as these may be used. The reactive silicone oil represented by the above formula (4) is commercially available as the product names "X-22-173DX", "X-22-170DX", "X-22-174BX", "X-22-176DX, and "X-22-3710" (all manufactured by Shin-Etsu Chemical Co., Ltd.), and the like, and a commercially-available product such as these may be used.

The reactive silicone oil preferably has a weight average molecular weight of 200 to 100,000, more preferably 200 to 50,000, and even more preferably 200 to 20,000. If the weight average molecular weight of the reactive silicone oil is too low, the effect of adding the reactive silicone oil may be reduced. On the other hand, if the weight average molecular weight is too large, the viscosity of the reactive silicone oil becomes high, which can cause handling to be difficult.

The reactive silicone oil preferably has a kinematic viscosity (20° C., units: $mm^2/s$) of 10 to 10000, more preferably 20 to 1000, and particularly preferably 20 to 500.

The amount of the reactive silicone oil blended in the nitrile rubber composition of the present invention is, with respect to 100 parts by weight of the carboxyl group-containing nitrile rubber, preferably 0.1 to 30 parts by weight, more preferably 0.5 to 20 parts by weight, and even more preferably 1 to 15 parts by weight. If the amount of the reactive silicone oil blended is too small, it is difficult to obtain the effect of blending the reactive silicone oil. On the other hand, if the amount blended is too large, the physical properties (e.g., strength and elongation) of the cross-linked rubber to be obtained may decrease.

In addition, the nitrile rubber composition of the present invention may contain a cross-linking agent. The cross-linking agent is not particularly limited, and as examples thereof, a sulfur cross-linking agent, an organic peroxide cross-linking agent, a polyamine cross-linking agent, and the like, may be mentioned. Even among these, an organic peroxide cross-linking agent and a polyamine cross-linking agent are preferable, and a polyamine cross-linking agent is more preferable.

As the organic peroxide cross-linking agent, a conventionally known cross-linking agent can be used, and as examples thereof, dicumyl peroxide, cumene hydroperoxide, t-butyl cumyl peroxide, paramenthane hydroperoxide, di-t-butyl peroxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butylvalerate, 2,5-dimethyl-2,5-di-t-butylperoxyhexane, 2,5-dimethyl-2,5-di-t-butylperoxyhexine-3, 1,1-di-t-butylperoxy-3,5,5-trimethylcyclohexane, p-chlorobenzoyl peroxide, t-butylperoxyisopropyl carbonate, t-butyl peroxybenzoate, and the like, may be mentioned. These can be used singly or in combinations of two or more.

The polyamine cross-linking agent is not particularly limited as long as it is a compound having two or more amino groups or a compound which becomes a form having two or more amino groups at the time of cross-linking. However, the polyamine cross-linking agent is preferably a compound in which a plurality of hydrogen atoms of an aliphatic hydrocarbon or aromatic hydrocarbon are substituted with amino groups or hydrazide structures (structures represented by —CONHNH$_2$, where CO represents a carbonyl group), and a compound which becomes such foam at the time of cross-linking. As specific examples, an aliphatic polyvalent amine, such as hexamethylenediamine, hexamethylenediamine carbamate, N,N'-dicinnamylidene-1,6-hexanediamine, tetramethylenepentamine, hexamethylenediamine cinnamaldehyde adducts, and hexamethylenediamine dibenzoate salt; an aromatic polyvalent amine, such as 2,2-bis{4-(4-aminophenoxy)phenyl}propane, 4,4'-methylenedianiline, m-phenylenediamine, p-phenylenediamine, and 4,4'-methylenebis(o-chloroaniline); a compound having two or more hydrazide structures, such as dihydrazide isophthalate, dihydrazide adipate, and dihydrazide sebacate; and the like, may be mentioned. Even among these, 2,2-bis{4-(4-aminophenoxy)phenyl}propane and hexamethylenediamine carbamate are preferable, and hexamethylenediamine carbamate is particularly preferable.

Here, the reactive silicone oil described above may, depending on the type, also act as a cross-linking agent, and hence it is desirable to appropriately determine the amount of the cross-linking agent blended in the nitrile rubber composition of the present invention in accordance with the type and the amount blended of the reactive silicone oil that is used. However, the amount of the cross-linking agent blended is, with respect to 100 parts by weight of the carboxyl group-containing nitrile rubber, preferably 0.1 to 50 parts by weight, more preferably 0.5 to 25 parts by weight, and even more preferably 1 to 10 parts by weight. In the present invention, when a compound having a high cross-linking reactivity (e.g., a compound represented by the above formula (6)) is used as the reactive silicone oil, depending on the amount of the reactive silicone oil blended, it may not always be necessary to add a cross-linking agent.

Further, the nitrile rubber composition of the present invention preferably further contains a basic cross-linking accelerator. By further including a basic cross-linking accelerator, the effect of the present invention becomes even more remarkable.

As specific examples of the basic cross-linking accelerator, a basic cross-linking accelerator having a cyclic amidine structure, such as 1,8-diazabicyclo[5,4,0]undecene-7 (hereinafter, sometimes abbreviated as "DBU"), 1,5-diazabicyclo[4,3,0]nonene-5 (hereinafter, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, and 1-ethoxymethyl-2-methylimidazoline; a guanidine-based basic cross-linking accelerator, such as tetramethylguanidine, tetraethylguanidine, diphenylguanidine, 1,3-di-o-tolylguanidine, and o-tolylbiguanide; an aldehyde amine-based basic cross-linking accelerator, such as n-butylaldehyde aniline and acetaldehyde ammonia; a dicycloalkylamine, such as dicyclopentylamine, dicyclohexylamine, and dicycloheptylamine; a secondary amine basic cross-linking accelerator, such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylcyclooctylamine, N-hydroxymethylcyclopentylamine, N-hydroxybutylcyclohexylamine, N-methoxyethylcyclopentylamine, N-ethoxybutylcyclohexylamine, N-methoxycarbonylbutylcyclopentylamine, N-methoxycarbonylheptylcyclohexylamine, N-aminopropylcyclopentylamine, N-aminoheptylcyclohexylamine, di(2-chlorocyclopentyl)amine, and di(3-chlorocyclopentyl)amine; and the like, may be mentioned. Among these, a guanidine-based basic cross-linking accelerator and a basic cross-linking accelerator having a cyclic amidine structure are preferable, 1,3-di-o-tolylguanidine, 1,8-diazabicyclo[5,4,0]undecene-7, and 1,5-diazabicyclo[4,3,0]nonene-5 are more preferable, 1,8-diazabicyclo[5,4,0]undecene-7 and 1,5-diazabicyclo[4,3,0]nonene-5 are even more preferable, and 1,8-diazabicyclo[5,4,0]undecene-7 is particularly preferable. The basic cross-linking accelerator having a cyclic amidine structure may form a salt with an organic carboxylic acid, an alkyl phosphoric acid, and the like. Further, the secondary amine basic cross-linking accelerator may be a mixture of alkylene glycol or an alcohol such as alkyl alcohol having 5 to 20 carbon atoms, and may also further contain an inorganic acid and/or an organic acid. The secondary amine basic cross-linking accelerator and the inorganic acid and/or the organic acid may form a salt and may further form a complex with the alkylene glycol.

The amount of the basic cross-linking accelerator blended in the nitrile rubber composition of the present invention is, with respect to 100 parts by weight of the carboxyl group-containing nitrile rubber, preferably 0.1 to 20 parts by weight, more preferably 0.2 to 15 parts by weight, and even more preferably 0.5 to 10 parts by weight. If the amount of the basic cross-linking accelerator blended is too small, the cross-linking rate of the nitrile rubber composition may be too slow, whereby the cross-linking density decreases. On the other hand, if the amount blended is too large, the cross-linking rate of the cross-linkable rubber composition becomes too fast, which may cause scorching to occur and the storage stability to be harmed.

From the perspective of improving the mechanical strength and the compression set resistance of the cross-linked rubber to be obtained, the nitrile rubber composition of the present invention preferably contains silica as a reinforcing agent.

The silica is not particularly limited and may be a compound containing (SiO$_2$) in the composition formula. As specific examples thereof, natural silica, such as quartz powder and silica powder; synthetic silica such as silicic anhydride (silica gel, Aerosil and the like) and hydrous silicic acid; metal silicates; and the like, may be mentioned.

Even among these, synthetic silica and metal silicates are preferable, and synthetic silica is particularly preferable. The above-mentioned natural silica and synthetic silica have a composition formula of $(SiO_2)$ or $(SiO_2 \cdot nH_2O)$ wherein n is a positive integer.

Further, it is preferable that the synthetic silica is generally used as a so-called white reinforcing agent (white carbon) for a reinforcing agent for synthetic rubber. Further, silica having a pH of less than 7.5 is preferable.

The silica content in the nitrile rubber composition of the present invention is, with respect to 100 parts by weight of the carboxyl group-containing nitrile rubber, preferably 5 to 200 parts by weight, more preferably 10 to 100 parts by weight, and even more preferably 20 to 80 parts by weight. If the silica content is too small, the effect of improving the mechanical strength may not be obtained. On the other hand, if the content is too large, the effect of improving the compression set resistance may not be obtained.

Note that, the silicas can be used singly or in combinations of two or more.

In the nitrile rubber composition of the present invention, in addition to each of the above-described components, other blending agents ordinarily used in the rubber processing field may be added. As the blending agents, reinforcing agents other than silica, fillers, plasticizers, antioxidants, light stabilizers, scorch preventing agents, processing aids, lubricants, adhesives, lubricants, flame retardants, acid acceptors, mildew-proofing agents, antistatic agents, colorants, coupling agents, co-cross-linking agents, cross-linking aids, cross-linking retardants, foaming agents, and the like, may be mentioned. The amount of these blending agents blended can be suitably selected depending on the blending purpose.

As the reinforcing agent other than silica, carbon black, calcium carbonate, magnesium oxide, clay, surface treated silicate, staple fiber, an α,β-ethylenically unsaturated carboxylic acid metal salt such as zinc (meth)acrylate and magnesium (meth)acrylate, and the like, may be mentioned. Surface-treated silicate is a silicate that has been subjected to a surface treatment, and it is not particularly limited as long as the silicate which has been surface treated.

As plasticizers, it is not particularly limited, a trimellitic acid plasticizer, a pyromellitic acid plasticizer, an ether ester plasticizer, a polyester plasticizer, a phthalic acid plasticizer, an adipate plasticizer, a phosphate plasticizer, a sebacate plasticizer, an alkylsulfonate compound plasticizer, an epoxidized vegetable oil plasticizer, and the like, may be mentioned. As specific examples, tri-2-ethylhexyl trimellitate, isononyl trimellitate, mixed linear alkyl trimellitate, a dipentaerythritol ester, 2-ethylhexyl pyromellitate, a polyether ester (molecular weight of about 300 to 5000), bis[2-(2-butoxyethoxy)ethyl]adipate, dioctyl adipate, an adipic acid-based polyester (molecular weight of about 300 to 5000), dioctyl phthalate, diisononyl phthalate, dibutyl phthalate, tricresyl phosphate, dibutyl sebacate, phenyl alkylsulfonate, epoxidized soybean oil, diheptanoate, di-2-ethylhexanoate, didecanoate, and the like, may be mentioned. These may be used singly or in combinations of two or more.

As the coupling agent, it is not particularly limited, but, for example, a sulfur-containing silane coupling agent such as γ-mercaptopropyltrimethoxysilane, γ-mercaptomethyltrimethoxysilane, γ-mercaptomethyltriethoxysilane, γ-mercaptohexamethyldisilazane, bis(3-triethoxysilylpropyl)tetrasulfane, and bis(3-triethoxysilylpropyl)disulfane; an epoxy group-containing silane coupling agent such as γ-glycidoxypropyltrimethoxysilane, γ-glycidoxypropylmethyldimethoxysilane, β-(3,4-epoxycyclohexyl)ethyltrimethoxysilane, γ-mercaptopropyltrimethoxysilane, and γ-glycidoxypropylmethyldiethoxysilane; an amino group-containing silane coupling agent such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, and N-phenyl-3-aminopropyltrimethoxysilane; a (meth)acryloxy group-containing silane coupling agent such as γ-methacryloxypropyltrimethoxysilane, γ-methacryloxypropyltris(β-methoxyethoxy)silane, γ-methacryloxypropylmethyldimethoxysilane, γ-methacryloxypropylmethyldiethoxysilane, γ-methacryloxypropyltriethoxysilane, and γ-acryloxypropyltrimethoxysilane; a vinyl group-containing silane coupling agent such as vinyltrimethoxysilane, vinyltriethoxysilane, vinyltris(β-methoxyethoxy)silane, vinyltrichlorosilane, and vinyltriacetoxysilane; a chloropropyl group-containing silane coupling agent such as 3-chloropropyltrimethoxysilane; an isocyanate group-containing silane coupling agent such as 3-isocyanate propyltriethoxysilane; a styryl group-containing silane coupling agent such as p-styryltrimethoxysilane; an ureido group-containing silane coupling agent such as 3-ureidopropyltriethoxysilane; an allyl group-containing silane coupling agent such as diallyl dimethyl silane; an alkoxy group-containing silane coupling agent such as tetraethoxysilane; a phenyl group-containing silane coupling agent such as diphenyldimethoxysilane; a fluoro group-containing silane coupling agent such as trifluoropropyltrimethoxysilane; an alkyl group-containing silane coupling agent such as isobutyltrimethoxysilane and cyclohexylmethyldimethoxysilane; an aluminum-based coupling agent such as acetoalkoxyaluminum diisopropylate; a titanate-based coupling agent such as isopropyltriisostearoyl titanate, isopropyltris(dioctylpyrophosphate) titanate, isopropyltri(N-aminoethyl-aminoethyl) titanate, tetraoctylbis(ditridecylphosphite) titanate, tetra(2,2-diallyloxymethyl-1-butyl)-bis(ditridecyl)phosphite titanate, bis (dioctylpyrophosphate) oxyacetate titanate, bis(dioctylpyrophosphate)ethylene titanate, tetraisopropylbis (dioctylphosphite) titanate, and isopropyltriisostearoyl titanate; and the like, may be mentioned. These may be used singly or in combination of two or more.

In the nitrile rubber composition of the present invention, a rubber other than the above-mentioned carboxyl group-containing nitrile rubber may be blended as long as the effects of the present invention are not impaired.

As such a rubber, acrylic rubber, ethylene-acrylic acid copolymer rubber, styrene-butadiene copolymer rubber, polybutadiene rubber, ethylene-propylene copolymer rubber, ethylene-propylene-diene terpolymer rubber, epichlorohydrin rubber, urethane rubber, chloroprene rubber, silicone rubber, fluororubber, natural rubber, polyisoprene rubber, and the like, may be mentioned.

In the case of blending a rubber other than the carboxyl group-containing nitrile rubber, the amount blended in the nitrile rubber composition is, with respect to 100 parts by weight of the carboxyl group-containing nitrile rubber, preferably 60 parts by weight or less, more preferably 30 parts by weight or less, and even more preferably 10 parts by weight or less.

The nitrile rubber composition of the present invention is prepared by mixing each of the above-mentioned components preferably in a nonaqueous system. An example of a method for suitably preparing the nitrile rubber composition of the present invention is to subject the components excluding the components unstable to heat, such as the reactive silicone oil and the cross-linking agent, to primary kneading with a mixer such as a Banbury mixer, an internal mixer, and a kneader, then transferring the mixture to an open roll and the like, adding the components unstable to heat, such as the reactive silicone oil and the cross-linking agent, and performing secondary kneading. The primary kneading is usually carried out at a temperature of 10 to 200° C., and preferably 30 to 180° C., for 1 minute to 1 hour, and preferably 1 minute to 30 minutes. The secondary kneading is usually carried out at a temperature of 10 to 100° C., and preferably 20 to 60° C., for 1 minute to 1 hour, and preferably 1 minute to 30 minutes.

The nitrile rubber composition of the present invention preferably has a compound Mooney viscosity (ML1+4, 100° C.) of 5 to 200, more preferably 10 to 150, and particularly preferably 20 to 120. In particular, since the nitrile rubber composition of the present invention contains a reactive silicone oil, the compound Mooney viscosity can be within the above range, whereby the nitrile rubber composition of the present invention has excellent processability.

Cross-Linked Rubber

The cross-linked rubber of the present invention is obtained by cross-linking the nitrile rubber composition of the present invention described above.

The cross-linked rubber of the present invention can be produced by using the nitrile rubber composition of the present invention, for example, by using a foaming machine corresponding to the desired shape, such as an extruder, an injection molding machine, a press, or rolls, to carry out forming, and then heating to cause a cross-linking reaction and fix the shape as a cross-linked product. In this case, it is possible to form the rubber and then cross-link or to perform the forming and the cross-linking simultaneously. The forming temperature is usually 10 to 200° C., and preferably 25 to 120° C. The cross-linking temperature is usually 100 to 200° C., and preferably 130 to 190° C. The cross-linking time is usually 1 minute to 24 hours, preferably 2 minutes to 12 hours, and particularly preferably 3 minutes to 6 hours.

Further, depending on the shape, size, and the like of the cross-linked rubber, sometimes, even if the surface is cross-linked, the interior part is not sufficiently cross-linked. Therefore, the rubber may be further heated to carry out secondary cross-linking.

As the heating method, a general method used for cross-linking rubber, such as press heating, steam heating, oven heating, and hot air heating may be appropriately selected.

Since the cross-linked rubber of the present invention is one obtained by using the above-mentioned nitrile rubber composition of the present invention, normal physical properties can be maintained at a good level (that is, tensile strength and elongation at break can be maintained at a good level), heat resistance and cold resistance are excellent, and even when used in contact with oil, changes in the physical properties (e.g., changes in hardness or cold resistance) is suppressed.

Therefore, by taking advantage of such characteristics, the cross-linked rubber of the present invention can be used for various seal members, such as O-rings, packings, diaphragms, oil seals, shaft seals, bearing seals, well head seals, air compressor seals, hermetic seals for long-life coolant, hermetic seals for Freon, fluorohydrocarbons, or carbon dioxide used in compressors for cooling devices for air-conditioners or refrigerating machines of air-conditioning systems, hermetic seals for supercritical carbon dioxide or subcritical carbon dioxide used for the washing media in precision washing, seals for roller devices (roller bearings, automotive hub units, automotive water pumps, linear guide devices, ball screws, etc.), valves and valve seats, BOP (blow out preventers), and bladders; various types of gaskets, such as intake manifold gaskets that are attached at connecting parts of intake manifolds and cylinder heads, cylinder head gaskets that are attached at connecting parts of cylinder blocks and cylinder heads, rocker cover gaskets that are attached at connecting parts of rocker covers and cylinder heads, oil pan gaskets that are attached at connecting parts of oil pans and cylinder blocks or transmission cases, fuel cell separator gaskets that are attached between pairs of housings straddling unit cells provided with positive electrodes, electrolyte plates, and negative electrodes, and top cover use gaskets for hard disk drives; various types of rolls such as printing rolls, ironmaking rolls, papermaking rolls, industrial rolls, and office equipment rolls; various types of belts, such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT belts, timing belts, toothed belts, conveyor belts, and in-oil belts; various types of hoses, such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; various types of boots, such as CVJ boots, propeller shaft boots, constant velocity joint boots, and rack and pinion boots; attenuating member rubber parts, such as cushion materials, dynamic dampers, rubber couplings, air springs, and shock absorbers; dust covers, automotive interior members, tires, covered cables, shoe soles, electromagnetic wave shields, adhesives for flexible printed circuits boards or other adhesives, fuel cell separators, as well as in a broad range of other applications in cosmetics, the pharmaceutical field, fields that come in contact with food, the electronics field, and the like. Among these examples, the cross-linked product of the present invention can be suitably used as a seal material, a belt, a hose, or a gasket.

EXAMPLES

The present invention will now be described based on even more detailed examples, but the present invention is not limited to these examples. Note that, unless stated otherwise, "parts" are based on weight. The tests and evaluations were conducted as follows.

Composition of Carboxyl Group-Containing Nitrile Rubber

The content ratio of each of the monomer units forming the carboxyl group-containing nitrile rubber was measured by the following method.

Specifically, the content ratio of mono-n-butyl maleate unit was calculated by adding 100 ml of 2-butanone to 0.2 g of a 2 mm-square piece of carboxyl group-containing nitrile rubber, stirring for 16 hours, adding 20 ml of ethanol and 10 ml of water, then titrating the mixture while stirring using a solution of potassium hydroxide in 0.02 N aqueous ethanol at room temperature using thymolphthalein as an indicator to determine the number of moles of carboxyl group with respect to 100 g of the carboxyl group-containing nitrile rubber, and converting the determined number of moles to the amount of mono-n-butyl maleate unit.

The content ratios of 1,3-butadiene unit and saturated butadiene unit were calculated by measuring the iodine value (JIS K 6235) of the carboxyl group-containing nitrile rubber before the hydrogenation reaction and after the hydrogenation reaction.

The content ratio of acrylonitrile unit was calculated by measuring the nitrogen content in the carboxyl-containing nitrile rubber by the Kjeldahl method in accordance with JIS K 6383.

The content ratios of n-butyl acrylate unit, methoxyethyl acrylate unit, and methacrylic acid unit were calculated as the remainder of the above monomer units.

Iodine Value

The iodine value of the carboxyl group-containing nitrile rubber was measured in accordance with JIS K 6235.

Normal Physical Properties (Tensile Strength and Elongation at Break)

The nitrile rubber composition was placed in a 15 cm high, 15 cm long, and 0.2 cm deep mold, and pressed-molded at a pressure of 10 MPa while heating at 170° C. for 20 minutes to obtain a sheet-shaped cross-linked product. Next, the obtained cross-linked product was transferred to Geer oven and subjected to secondary cross-linking at 170° C. for 4 hours, then the obtained sheet-shaped cross-linked rubber was punched with a No. 3 dumbbell to prepare a test piece. Further, the obtained test piece was used for measurement of the tensile strength and the elongation at break of the cross-linked rubber in accordance with JIS K 6251.

Compression Set Test

Using a mold having a 30 mm inner diameter and a 3 mm ring diameter, a nitrile rubber composition was cross-linked at a temperature of 170° C. for 20 minutes at a pressure of 10 MPa, and then subjected to secondary cross-linking for 4 hours at 170° C. to obtain O-ring shaped test piece. Then, the obtained O-ring shaped test piece was used to measure the O-ring compression set in accordance with JIS K 6262 under conditions of the O-ring shaped test piece sandwiched between two flat surfaces at a distance compressed 25% in the ring thickness direction held at 150° C. for 168 hours. The smaller the measured value, the better the compression set resistance.

Cold Resistance Test

A sheet-shaped cross-linked rubber was obtained in the same manner as in the evaluation of the normal physical properties, and then the cold resistance was measured by a TR test (low temperature elastic recovery test) in accordance with JIS K 6261. TR10 (units: ° C.) is an indicator of cold resistance. The lower this TR10 value is, the better the cold resistance is judged to be.

Heat Aging Resistance Test

A sheet-shaped cross-linked rubber was obtained in the same manner as in the evaluation of the normal physical properties, and then an air heat aging test was carried out in accordance with JIS K 6257. The cross-linked rubber was held in Geer oven at a temperature of 150° C. for 168 hours and then subjected to a tensile test in the same manner as for the normal physical properties to measure the elongation change rate. The smaller the absolute value of the elongation change rate is, the better the heat aging resistance is judged to be.

Synthesis Example 1

Synthesis of Carboxyl Group-Containing Nitrile Rubber (A-1)

A reactor was charged with 180 parts of ion-exchanged water, 25 parts of aqueous sodium dodecylbenzene sulfonate having a concentration of 10% by weight, 21 parts of acrylonitrile (AN), 3 parts of mono n-butyl maleate, 35 parts of n-butyl acrylate (BA), and 0.5 parts of t-dodecylmercaptan (molecular weight regulator) in that order, the gases contained in the reactor were purged three times with nitrogen, and then 39 parts of 1,3-butadiene was charged into the reactor. While keeping the temperature of the reactor at 5° C., 0.1 parts of cumene hydroperoxide (polymerization initiator) was charged and the polymerization reaction was continued while stirring. At the point during the reaction when the polymerization conversion rate reached 40% and 60%, 1 part of mono-n-butyl maleate was added respectively and the polymerization reaction was continued for another 16 hours. Next, 0.1 parts of aqueous hydroquinone (polymerization terminator) having a concentration of 10% by weight was added to terminate the polymerization reaction, and the residual monomers were removed using a rotary evaporator at a water temperature of 60° C. to obtain a latex of a carboxyl group-containing nitrile rubber (L1-1) (solid content concentration of about 30% by weight).

The latex (L1-1) and a palladium catalyst (solution obtained by mixing equal parts by weight of ion-exchanged water and a 1% by weight palladium acetate acetone solution) were added into an autoclave so that the palladium content based on the dry weight of the rubber contained in the latex (L1-1) was 1,000 ppm, and a hydrogenation reaction was carried out at a hydrogen pressure of 3 MPa and a temperature of 50° C. for 6 hours to obtain a latex of a carboxyl group-containing nitrile rubber (L2-1).

Then, the obtained latex (L2-1) was solidified by adding methanol in an amount twice the volume of the latex (L2-1), and the resultant solid (crumbs) was taken out by filtration and vacuum-dried at 60° C. for 12 hours to obtain a carboxyl group-containing nitrile rubber (A-1). The iodine value of the carboxyl group-containing nitrile rubber (A-1) was 9, and the carboxyl group content was 0.026 ephr. The content ratio of each monomer unit constituting the carboxyl group-containing nitrile rubber (A-1) was 21.0% by weight of the acrylonitrile (AN) unit, 4.5% by weight of the mono n-butyl maleate unit, 30.3% by weight of the n-butyl acrylate (BA) unit, and 44.2% by weight of the 1,3-butadiene unit (including hydrogenated portion).

Synthesis Example 2

Synthesis of Carboxyl Group-Containing Nitrile Rubber (A-2)

A reactor was charged with 180 parts of ion-exchanged water, 25 parts of aqueous sodium dodecylbenzene sulfonate having a concentration of 10% by weight, 23 parts of acrylonitrile (AN), 4.5 parts of mono n-butyl maleate, 30.5 parts of methoxyethyl acrylate (MEA), and 0.5 parts of t-dodecylmercaptan (molecular weight regulator) in that order, the gases contained in the reactor were purged three times with nitrogen, and then 40 parts of 1,3-butadiene was charged into the reactor. While keeping the temperature of the reactor at 5° C., 0.1 parts of cumene hydroperoxide (polymerization initiator) was charged and the polymerization reaction was continued while stirring. At the point during the reaction when the polymerization conversion rate reached 40% and 60%, 1 part of mono-n-butyl maleate was added respectively and the polymerization reaction was continued for another 16 hours. Next, 0.1 parts of aqueous hydroquinone (polymerization terminator) having a concentration of 10% by weight was added to terminate the polymerization reaction, and the residual monomers were removed using a rotary evaporator at a water temperature of 60° C. to obtain a latex of a carboxyl group-containing nitrile rubber (L1-2) (solid content concentration of about 30% by weight).

The latex (L1-2) and a palladium catalyst (solution obtained by mixing equal parts by weight of ion-exchanged water and a 1% by weight palladium acetate acetone solution) were added into an autoclave so that the palladium content based on the dry weight of the rubber contained in the latex (L1-2) was 1,000 ppm, and a hydrogenation reaction was carried out at a hydrogen pressure of 3 MPa and a temperature of 50° C. for 6 hours to obtain a latex of a carboxyl group-containing nitrile rubber (L2-2).

Then, the obtained latex (L2-2) was solidified by adding methanol in an amount twice the volume of the latex (L2-2), and the resultant solid (crumbs) was taken out by filtration and vacuum-dried at 60° C. for 12 hours to obtain a carboxyl group-containing nitrile rubber (A-2). The iodine value of the carboxyl group-containing nitrile rubber (A-2) was 10, and the carboxyl group content was 0.034 ephr. The content ratio of each monomer unit constituting the carboxyl group-containing nitrile rubber (A-2) was 24.0% by weight of the acrylonitrile (AN) unit, 6.4% by weight of the mono n-butyl maleate unit, 22.9% by weight of the methoxyethyl acrylate (MEA) unit, and 46.7% by weight of the 1,3-butadiene unit (including hydrogenated portion).

Synthesis Example 3

Synthesis of Carboxyl Group-Containing Nitrile Rubber (A-3)

A reactor was charged with 180 parts of ion-exchanged water, 25 parts of aqueous sodium dodecylbenzene sulfonate having a concentration of 10% by weight, 16 parts of acrylonitrile (AN), 3 parts of mono n-butyl maleate, 36 parts of n-butyl acrylate (BA), and 0.5 parts of t-dodecylmercaptan (molecular weight regulator) in that order, the gases contained in the reactor were purged three times with nitrogen, and then 43 parts of 1,3-butadiene was charged into the reactor. While keeping the temperature of the reactor at 5° C., 0.1 parts of cumene hydroperoxide (polymerization initiator) was charged and the polymerization reaction was continued while stirring. At the point during the reaction when the polymerization conversion rate reached 40% and 60%, 1 part of mono-n-butyl maleate was added respectively and the polymerization reaction was continued for another 16 hours. Next, 0.1 parts of aqueous hydroquinone (polymerization terminator) having a concentration of 10% by weight was added to terminate the polymerization reaction, and the residual monomers were removed using a rotary evaporator at a water temperature of 60° C. to obtain a latex of a carboxyl group-containing nitrile rubber (L1-3) (solid content concentration of about 30% by weight).

The latex (L1-3) and a palladium catalyst (solution obtained by mixing equal parts by weight of ion-exchanged water and a 1% by weight palladium acetate acetone solution) were added into an autoclave so that the palladium content based on the dry weight of the rubber contained in the latex (L1-3) was 1,000 ppm, and a hydrogenation reaction was carried out at a hydrogen pressure of 3 MPa and a temperature of 50° C. for 6 hours to obtain a latex of a carboxyl group-containing nitrile rubber (L2-3).

Then, the obtained latex (L2-3) was solidified by adding methanol in an amount twice the volume of the latex (L2-3), and the resultant solid (crumbs) was taken out by filtration and vacuum-dried at 60° C. for 12 hours to obtain a carboxyl group-containing nitrile rubber (A-3). The iodine value of the carboxyl group-containing nitrile rubber (A-3) was 10, and the carboxyl group content was 0.026 ephr. The content ratio of each monomer unit constituting the carboxyl group-containing nitrile rubber (A-3) was 16.0% by weight of the acrylonitrile (AN) unit, 5.4% by weight of the mono n-butyl maleate unit, 34.2% by weight of the n-butyl acrylate (BA) unit, and 44.4% by weight of the 1,3-butadiene unit (including hydrogenated portion).

Synthesis Example 4

Synthesis of Carboxyl Group-Containing Nitrile Rubber (A'-4)

A reactor was charged with 180 parts of ion-exchanged water, 25 parts of aqueous sodium dodecylbenzene sulfonate having a concentration of 10% by weight, 37 parts of acrylonitrile (AN), 4 parts of mono n-butyl maleate, and 0.5 parts of t-dodecylmercaptan (molecular weight regulator) in that order, the gases contained in the reactor were purged three times with nitrogen, and then 57 parts of 1,3-butadiene was charged into the reactor. While keeping the temperature of the reactor at 5° C., 0.1 parts of cumene hydroperoxide (polymerization initiator) was charged and the polymerization reaction was continued while stirring. At the point during the reaction when the polymerization conversion rate reached 40% and 60%, 1 part of mono-n-butyl maleate was added respectively and the polymerization reaction was continued for another 16 hours. Next, 0.1 parts of aqueous hydroquinone (polymerization terminator) having a concentration of 10% by weight was added to terminate the polymerization reaction, and the residual monomers were removed using a rotary evaporator at a water temperature of 60° C. to obtain a latex of a carboxyl group-containing nitrile rubber (L1-4) (solid content concentration of about 30% by weight).

The latex (L1-4) and a palladium catalyst (solution obtained by mixing equal parts by weight of ion-exchanged water and a 1% by weight palladium acetate acetone solution) were added into an autoclave so that the palladium content based on the dry weight of the rubber contained in the latex (L1-4) was 1,000 ppm, and a hydrogenation reaction was carried out at a hydrogen pressure of 3 MPa and a temperature of 50° C. for 6 hours to obtain a latex of a carboxyl group-containing nitrile rubber (L2-4).

Then, the obtained latex (L2-4) was solidified by adding methanol in an amount twice the volume of the latex (L2-4), and the resultant solid (crumbs) was taken out by filtration and vacuum-dried at 60° C. for 12 hours to obtain a carboxyl group-containing nitrile rubber (A'-4). The iodine value of the carboxyl group-containing nitrile rubber (A'-4) was 10, and the carboxyl group content was 0.029 ephr. The content ratio of each monomer unit constituting the carboxyl group-containing nitrile rubber (A'-4) was 36% by weight of the acrylonitrile (AN) unit, 5.9% by weight of the mono n-butyl maleate unit, and 58.1% by weight of the 1,3-butadiene unit (including hydrogenated portion).

Synthesis Example 5

Synthesis of Nitrile Rubber (A'-5)

A reactor was charged with 180 parts of ion-exchanged water, 25 parts of aqueous sodium dodecylbenzene sulfonate having a concentration of 10% by weight, 36 parts of acrylonitrile (AN), and 0.5 parts of t-dodecylmercaptan (molecular weight regulator) in that order, the gases contained in the reactor were purged three times with nitrogen, and then 64 parts of 1,3-butadiene was charged into the reactor. While keeping the temperature of the reactor at 5° C., 0.1 parts of cumene hydroperoxide (polymerization initiator) was charged and the polymerization reaction was continued for 16 hours while stirring. Next, 0.1 parts of aqueous hydroquinone (polymerization terminator) having a concentration of 10% by weight was added to terminate the polymerization reaction, and the residual monomers were removed using a rotary evaporator at a water temperature of 60° C. to obtain a latex of a nitrile rubber (L1-5) (solid content concentration of about 30% by weight).

The latex (L1-5) and a palladium catalyst (solution obtained by mixing equal parts by weight of ion-exchanged water and a 1% by weight palladium acetate acetone solution) were added into an autoclave so that the palladium content based on the dry weight of the rubber contained in the latex (L1-5) was 1,000 ppm, and a hydrogenation reaction was carried out at a hydrogen pressure of 3 MPa and a temperature of 50° C. for 6 hours to obtain a latex of a nitrile rubber (L2-5).

Then, the obtained latex (L2-5) was solidified by adding methanol in an amount twice the volume of the latex (L2-5), and the resultant solid (crumbs) was taken out by filtration and vacuum-dried at 60° C. for 12 hours to obtain a nitrile rubber (A'-5). The iodine value of the carboxyl group-containing nitrile rubber (A'-5) was 10. The content ratio of each monomer unit constituting the nitrile rubber (A'-5) was 36% by weight of the acrylonitrile (AN) unit and 64% by weight of the 1,3-butadiene unit (including hydrogenated portion).

Synthesis Example 6

Synthesis of Nitrile Rubber (A'-6)

A reactor was charged with 180 parts of ion-exchanged water, 25 parts of aqueous sodium dodecylbenzene sulfonate having a concentration of 10% by weight, 21 parts of acrylonitrile (AN), 36 parts of n-butyl acrylate (BA), and 0.5 parts of t-dodecylmercaptan (molecular weight regulator) in that order, the gases contained in the reactor were purged three times with nitrogen, and then 43 parts of 1,3-butadiene was charged into the reactor. While keeping the temperature of the reactor at 5° C., 0.1 parts of cumene hydroperoxide (polymerization initiator) was charged and the polymerization reaction was continued for 16 hours while stirring. Next, 0.1 parts of aqueous hydroquinone (polymerization terminator) having a concentration of 10% by weight was added to terminate the polymerization reaction, and the residual monomers were removed using a rotary evaporator at a water temperature of 60° C. to obtain a latex of a nitrile rubber (L1-6) (solid content concentration of about 30% by weight). Then, the obtained latex (L1-6) was solidified by adding methanol in an amount twice the volume of the latex (L1-6), and the resultant solid (crumbs) was taken out by filtration and vacuum-dried at 60° C. for 12 hours to obtain a nitrile rubber (A'-6). The iodine value of the carboxyl group-containing nitrile rubber (A'-6) was 200. The content ratio of each monomer unit constituting the nitrile rubber (A'-6) was 21% by weight of the acrylonitrile (AN) unit, 34.2% by weight of the n-butyl acrylate (BA) unit, and 44.8% by weight of the 1,3-butadiene unit.

Synthesis Example 7

Synthesis of Carboxyl Group-Containing Nitrile Rubber (A'-7)

A reactor was charged with 180 parts of ion-exchanged water, 25 parts of aqueous sodium dodecylbenzene sulfonate having a concentration of 10% by weight, 37 parts of acrylonitrile (AN), 4 parts of methacrylic acid, and 0.5 parts of t-dodecylmercaptan (molecular weight regulator) in that order, the gases contained in the reactor were purged three times with nitrogen, and then 53 parts of 1,3-butadiene was charged into the reactor. While keeping the temperature of the reactor at 5° C., 0.1 parts of cumene hydroperoxide (polymerization initiator) was charged and the polymerization reaction was continued while stirring. At the point during the reaction when the polymerization conversion rate reached 40% and 60%, 1 part of methacrylic acid was added respectively and the polymerization reaction was continued for another 16 hours. Next, 0.1 parts of aqueous hydroquinone (polymerization terminator) having a concentration of 10% by weight was added to terminate the polymerization reaction, and the residual monomers were removed using a rotary evaporator at a water temperature of 60° C. to obtain a latex of a carboxyl group-containing nitrile rubber (L1-7) (solid content concentration of about 30% by weight).

The latex (L1-7) and a palladium catalyst (solution obtained by mixing equal parts by weight of ion-exchanged water and a 1% by weight palladium acetate acetone solution) were added into an autoclave so that the palladium content based on the dry weight of the rubber contained in the latex (L1-7) was 1,000 ppm, and a hydrogenation reaction was carried out at a hydrogen pressure of 3 MPa and a temperature of 50° C. for 6 hours to obtain a latex of a carboxyl group-containing nitrile rubber (L2-7).

Then, the obtained latex (L2-7) was solidified by adding methanol in an amount twice the volume of the latex (L2-7), and the resultant solid (crumbs) was taken out by filtration and vacuum-dried at 60° C. for 12 hours to obtain a carboxyl group-containing nitrile rubber (A'-7). The iodine value of the carboxyl group-containing nitrile rubber (A'-7) was 10, and the carboxyl group content was 0.031 ephr. The content ratio of each monomer unit constituting the carboxyl group-containing nitrile rubber (A'-7) was 37.0% by weight of the acrylonitrile (AN) unit, 5.8% by weight of the methacrylic acid unit, and 43.2% by weight of the 1,3-butadiene unit (including hydrogenated portion).

Example 1

Using a Banbury mixer, to 100 parts of the carboxyl group-containing nitrile rubber (A-1) obtained in Synthesis Example 1, 2 parts of amino-modified silicone oil (product name "KF-868", manufactured by Shin-Etsu Chemical Co., Ltd., kinematic viscosity at 25° C.: 90 mm$^2$/s, functional group equivalent: 8800 g/mol, compound in which $X^1$=NH$_2$ in the above formula (1)), 50 parts of silica (B-1) (product name "ULTRASIL VN2", manufactured by EVONIK, filler), 5 parts of tri-2-ethylhexyl trimellitate (product name "ADK Cizer C-8", manufactured by ADEKA Corporation, plasticizer), 1.5 parts of 4,4'-di-(α,α-dimethylbenzyl)diphenylamine (product name "Naugard 445", manufactured by Crompton Corporation, antiaging agent), 1 part of stearic acid (processing aid), and 1 part of a polyoxyethylene alkyl ether phosphate (product name "Phosphanol RL-210", manufactured by Toho Chemical Industry, processing aid) were added and kneaded. Then, the mixture was transferred to a roll, and 2.0 parts of hexamethylenediamine carbamate (product name "Diak #1", manufactured by DuPont Dow Elastomer, polyamine cross-linking agent categorized as an aliphatic polyvalent amine) and 4 parts of 1,8-diazabicyclo[5,4,0]undecene-7 (DBU) (product name "RHENOGRAN XLA-60 (GE 2014)", manufactured by Rhein Chemie, DBU 60% product (including portion that becomes a zinc dialkyl diphosphate salt), basic cross-linking accelerator) were added and kneaded to prepare a nitrile rubber composition.

Then, the evaluation and testing of the normal physical properties (tensile strength and elongation at break), compression set test, cold resistance test, and heat aging resistance test were conducted according to the methods described above. The results are shown in Table 1.

Example 2

A nitrile rubber composition was prepared and evaluated in the same manner as in Example 1, except that the amount of the amino-modified silicone oil used in Example 1 was changed to 5 parts. The results are shown in Table 1.

Example 3

A nitrile rubber composition was prepared and evaluated in the same manner as in Example 1, except that the amount of the amino-modified silicone oil used in Example 1 was changed to 10 parts. The results are shown in Table 1.

Example 4

A nitrile rubber composition was prepared and evaluated in the same manner as in Example 2, except that 50 parts of silica (B-2) (product name "Nipsil ER", manufactured by Tosoh Silica Corporation) was used instead of the silica (B-1) in Example 2. The results are shown in Table 1.

Example 5

A nitrile rubber composition was prepared and evaluated in the same manner as in Example 2, except that 50 parts of silica (B-3) (product name "Hi-Sil 532EP", manufactured PPG) was used instead of the silica (B-1) in Example 2. The results are shown in Table 1.

Example 6

A nitrile rubber composition was prepared and evaluated in the same manner as in Example 2, except that 5 parts of a polyether ester (product name "ADK Cizer RS700", manufactured by ADEKA Corporation, plasticizer) was used instead of the tri-2-ethylhexyl trimellitate in Example 2. The results are shown in Table 1.

Example 7

A nitrile rubber composition was prepared and evaluated in the same manner as in Example 2, except that 10.5 parts of 2,2-bis[4-(4-aminophenoxy)phenyl]propane (product name "NORCURE 1313-50", manufactured by Nordmann, Rassmann, 50% product, polyamine cross-linking agent categorized as an aromatic polyvalent amine) was used instead of the hexamethylenediamine carbamate in Example 2. The results are shown in Table 1.

Example 8

A nitrile rubber composition was prepared and evaluated in the same manner as in Example 2, except that 5 parts of an epoxy-modified silicone oil (trade name "X-22-343", manufactured by Shin-Etsu Chemical Co., Ltd., kinematic viscosity at 25° C.: 25 mm$^2$/s, functional group equivalent: 525 g/mol, compound in which $X^1$=epoxy in the above formula) was used instead of the amino-modified silicone oil in Example 2. The results are shown in Table 1.

Example 9

A nitrile rubber composition was prepared and evaluated in the same manner as in Example 2, except that the amount of the silica (B-1) used in Example 2 was changed to 30 parts and 30 parts of a clay (product name: "Burgess KE", manufactured by Burgess Pigment, filler) was additionally added at the time of adding the silica (B-1). The results are shown in Table 1.

Example 10

A nitrile rubber composition was prepared and evaluated in the same manner as in Example 9, except that 10.5 parts of 2,2-bis[4-(4-aminophenoxy)phenyl]propane was used instead of the hexamethylenediamine carbamate in Example 9. The results are shown in Table 1.

Example 11

A nitrile rubber composition was prepared and evaluated in the same manner as in Example 9, except that the silica (B-1) was changed to silica (B-3). The results are shown in Table 1.

Example 12

A nitrile rubber composition was prepared and evaluated in the same manner as in Example 10, except that the silica (B-1) was changed to silica (B-3). The results are shown in Table 1.

Example 13

A nitrile rubber composition was prepared and evaluated in the same manner as in Example 2, except that 100 parts of the carboxyl group-containing nitrile rubber (A-2) was used instead of the carboxyl group-containing nitrile rubber (A-1) in Example 2, and the amount of the hexamethylenediamine carbamate used was changed to 2.7 parts. The results are shown in Table 1.

Example 14

A nitrile rubber composition was prepared and evaluated in the same manner as in Example 2, except that 100 parts of the carboxyl group-containing nitrile rubber (A-3) was used instead of the carboxyl group-containing nitrile rubber (A-1) in Example 2. The results are shown in Table 1.

Comparative Example 1

A nitrile rubber composition was prepared and evaluated in the same manner as in Example 1, except that the amino-modified silicone oil in Example 1 was not used. The results are shown in Table 2.

Comparative Example 2

A nitrile rubber composition was prepared and evaluated in the same manner as in Example 1, except that 4 parts of a silane coupling agent (product name "Structol HT 750", manufactured by Structol) was used instead of the amino-modified silicone oil in Example 1. The results are shown in Table 2.

Comparative Example 3

A nitrile rubber composition was prepared and evaluated in the same manner as in Example 1, except that 4 parts of the silane coupling agent was used instead of the amino-modified silicone oil and 10.5 parts of 2,2-bis[4-(4-aminophenoxy)phenyl]propane was used instead of the hexamethylenediamine carbamate in Example 1. The results are shown in Table 2.

Comparative Example 4

A nitrile rubber composition was prepared and evaluated in the same manner as in Comparative Example 2, except that 100 parts of the carboxyl group-containing nitrile rubber (A-3) was used instead of the carboxyl group-containing nitrile rubber (A-1). The results are shown in Table 2.

Comparative Example 5

A nitrile rubber composition was prepared and evaluated in the same manner as in Comparative Example 3, except that 100 parts of the carboxyl group-containing nitrile rubber (A-3) was used instead of the carboxyl group-containing nitrile rubber (A-1). The results are shown in Table 2.

Comparative Example 6

A nitrile rubber composition was prepared and evaluated in the same manner as in Example 2, except that 100 parts of the carboxyl group-containing nitrile rubber (A'-4) was used instead of the carboxyl group-containing nitrile rubber (A-1) in Example 2, and the amount of the hexamethylenediamine carbamate used was changed to 2.4 parts. The results are shown in Table 2.

Comparative Example 7

A nitrile rubber composition was prepared and evaluated in the same manner as in Example 2, except that 100 parts of the nitrile rubber (A'-5) was used instead of the carboxyl group-containing nitrile rubber (A-1) in Example 2, the polyoxyethylene alkyl ether phosphate ester, hexamethylenediamine carbamate, and 1,8-diazabicyclo[5,4,0]-undecene-7 (DBU) were not used, and 7 parts of 1,3-bis(t-butylperoxyisopropylbenzene) (product name "VUL-CUP 40KE", manufactured by ARKEMA, 40% product, organic peroxide cross-linking agent) was used. The results are shown in Table 2.

Comparative Example 8

A nitrile rubber composition was prepared and evaluated in the same manner as in Comparative Example 5, except that 100 parts of the nitrile rubber (A'-6) was used instead of the carboxyl group-containing nitrile rubber (A'-5) in Comparative Example 5. The results are shown in Table 2.

Comparative Example 9

A nitrile rubber composition was prepared and evaluated in the same manner as in Example 2, except that 100 parts of the carboxyl group-containing nitrile rubber (A'-7) was used instead of the carboxyl group-containing nitrile rubber (A-1) in Example 2, and 7 parts of 1,3-bis(t-butylperoxyisopropylbenzene) (product name "VUL-CUP 40KE", manufactured by ARKEMA, 40% product, organic peroxide cross-linking agent) was used instead of hexamethylenediamine carbamate. The results are shown in Table 2.

TABLE 1

|  |  | Example | | | | | | | | | | | | | |
| --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 13 | 14 |
| Blend of Nitrile Rubber Composition | | | | | | | | | | | | | | | |
| Carboxyl Group-Containing Nitrile Rubber (A-1) (AN monomer unit: 21.0% by weight, BA monomer unit: 30.3% by weight) | parts | 100 | 100 | 100 | 100 | 100 | 100 | 100 | 100 | 100 | 100 | 100 | 100 | | |
| Carboxyl Group-Containing Nitrile Rubber (A-2) (AN monomer unit: 24.0% by weight, MEA monomer unit: 22.9% by weight) | parts | | | | | | | | | | | | | 100 | |
| Carboxyl Group-Containing Nitrile Rubber (A-3) (AN monomer unit: 16.0% by weight, BA monomer unit: 34.2% by weight) | parts | | | | | | | | | | | | | | 100 |
| Carboxyl Group-Containing Nitrile Rubber (A'-4) (AN monomer unit: 36% by weight) | parts | | | | | | | | | | | | | | |
| Nitrile Rubber (A'-5) (AN monomer unit: 36% by weight) | parts | | | | | | | | | | | | | | |
| Nitrile Rubber (A'-6) | parts | | | | | | | | | | | | | | |
| Carboxyl Group-Containing Nitrile Rubber (A'-7) (AN monomer unit: 37.0% by weight) | parts | | | | | | | | | | | | | | |
| Amine-Modified Silicone Oil | parts | 2 | 5 | 10 | 5 | 5 | 5 | 5 | | 5 | 5 | 5 | 5 | 5 | 5 |
| Epoxy-Modified Silicone Oil | parts | | | | | | | | 5 | | | | | | |
| Silane Coupling Agent | parts | | | | | | | | | | | | | | |
| Silica (B-1) | parts | 50 | 50 | 50 | | 50 | 50 | 50 | 30 | 30 | | | 50 | 50 | |
| Silica (B-2) | parts | | | | 50 | | | | | | | | | | |
| Silica (B-3) | parts | | | | | 50 | | | | | 30 | 30 | | | |
| Clay | parts | | | | | | | | | 30 | 30 | 30 | 30 | | |

TABLE 1-continued

| | | Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Tri-2-Ethylhexyl Trimellitate | parts | 5 | 5 | 5 | 5 | 5 | | 5 | 5 | 5 | 5 | 5 | 5 | 5 | 5 |
| Polyether Ester | parts | | | | | | 5 | | | | | | | | |
| 4,4'-Di-(a,a-Dimethylbenzyl) Diphenylamine | parts | 1.5 | 1.5 | 1.5 | 1.5 | 1.5 | 1.5 | 1.5 | 1.5 | 1.5 | 1.5 | 1.5 | 1.5 | 1.5 | 1.5 |
| Stearic Aicd | parts | 1 | 1 | 1 | 1 | 1 | 1 | 1 | 1 | 1 | 1 | 1 | 1 | 1 | 1 |
| Polyoxyethylene Alkyl Ether Phosphate | parts | 1 | 1 | 1 | 1 | 1 | 1 | 1 | 1 | 1 | 1 | 1 | 1 | 1 | 1 |
| Hexamethylenediamine Carbamate | parts | 2.0 | 2.0 | 2.0 | 2.0 | 2.0 | 2.0 | | 2.0 | 2.0 | | 2.0 | | 2.7 | 2.0 |
| 2,2-Bis{4-(4-Aminophenoxy)Phenyl}Propane | parts | | | | | | | 10.5 | | | 10.5 | | 10.5 | | |
| 1,3-Bis(t-Butylperoxyisopropy)Benzene (40% product) | parts | | | | | | | | | | | | | | |
| 1,8-Diazabicyclo[5.4.0]Undecene-7 (60% product) | parts | 4 | 4 | 4 | 4 | 4 | 4 | 4 | 4 | 4 | 4 | 4 | 4 | 4 | 4 |
| Normal Physical Properties | | | | | | | | | | | | | | | |
| Tenile Strength | (MPa) | 19.7 | 19.8 | 19.5 | 19.3 | 19.5 | 19.4 | 19.9 | 20.4 | 15.4 | 15.3 | 16.4 | 16.2 | 19.6 | 18.4 |
| Elongation | (%) | 230 | 230 | 230 | 230 | 230 | 230 | 230 | 240 | 270 | 270 | 280 | 280 | 230 | 210 |
| Compression Set Test (O-ring) | | | | | | | | | | | | | | | |
| Compression set | (%) | 23 | 24 | 24 | 23 | 23 | 23 | 25 | 23 | 24 | 25 | 24 | 25 | 23 | 22 |
| Cold Resistance Test | | | | | | | | | | | | | | | |
| TR10 | (° C.) | −32 | −32 | −32 | −32 | −32 | −32 | −30 | −32 | −32 | −30 | −32 | −30 | −28 | −34 |
| Heat Aging Resistance Test | | | | | | | | | | | | | | | |
| Hesat Change rate | (%) | 0 | 0 | 0 | 0 | 0 | 0 | 0 | −4 | 0 | 0 | 0 | 0 | 0 | 0 |

TABLE 2

| | | Comparative Example | | | | | | | | |
|---|---|---|---|---|---|---|---|---|---|---|
| | | 1 | 2 | 3 | 4 | 5 | 6 | 7 | 8 | 9 |
| Blend of Nitrile Rubber Composition | | | | | | | | | | |
| Carboxyl Group-Containing Nitrile Rubber (A-1) (AN monomer unit: 21.0% by weight, BA monomer unit: 30.3% by weight) | parts | 100 | 100 | 100 | | | | | | |
| Carboxyl Group-Containing Nitrile Rubber (A-2) (AN monomer unit: 24.0% by weight, MEA monomer unit: 22.9% by weight) | parts | | | | | | | | | |
| Carboxyl Group-Containing Nitrile Rubber (A-3) (AN monomer unit: 16.0% by weight, BA monomer unit: 34.2% by weight) | parts | | | | 100 | 100 | | | | |
| Carboxyl Group-Containing Nitrile Rubber (A'-4) (AN monomer unit: 36% by weight) | parts | | | | | | 100 | | | |
| Nitrile Rubber (A'-5) (AN monomer unit: 36% by weight) | parts | | | | | | | 100 | | |
| Nitrile Rubber (A'-6) | parts | | | | | | | | 100 | |
| Carboxyl Group-Containing Nitrile Rubber (A'-7) (AN monomer unit: 37.0% by weight) | parts | | | | | | | | | 100 |
| Amine-Modified Silicone Oil | parts | | | | | 5 | 5 | 5 | 5 | |
| Epoxy-Modified Silicone Oil | parts | | | | | | | | | |
| Silane Coupling Agent | parts | | 4 | 4 | 4 | 4 | | | | |
| Silica (B-1) | parts | 50 | 50 | 50 | 50 | 50 | 50 | 50 | 50 | 50 |
| Silica (B-2) | parts | | | | | | | | | |
| Silica (B-3) | parts | | | | | | | | | |
| Clay | parts | | | | | | | | | |
| Tri-2-Ethylhexyl Trimellitate | parts | 5 | 5 | 5 | 5 | 5 | 5 | 5 | 5 | 5 |
| Polyether Ester | parts | | | | | | | | | |
| 4,4'-Di-(a,a-Dimethylbenzyl) Diphenylamine | parts | 1.5 | 1.5 | 1.5 | 1.5 | 1.5 | 1.5 | 1.5 | 1.5 | 1.5 |
| Stearic Aicd | parts | 1 | 1 | 1 | 1 | 1 | 1 | 1 | 1 | |
| Polyoxyethylene Alkyl Ether Phosphate | parts | 1 | 1 | 1 | 1 | 1 | 1 | | 1 | |
| Hexamethylenediamine Carbamate | parts | 2.0 | 2.0 | | 2.0 | | 2.4 | | | |
| 2,2-Bis{4-(4-Aminophenoxy)Phenyl}Propane | parts | | | 10.5 | | 10.5 | | | | |

TABLE 2-continued

|  |  | Comparative Example | | | | | | | | |
|---|---|---|---|---|---|---|---|---|---|---|
|  |  | 1 | 2 | 3 | 4 | 5 | 6 | 7 | 8 | 9 |
| 1,3-Bis(t-Butylperoxyisopropy)Benzene (40% product) | parts |  |  |  |  |  |  | 7 | 7 | 7 |
| 1,8-Diazabicyclo[5.4.0]Undecene-7 (60% product) | parts | 4 | 4 | 4 | 4 | 4 | 4 |  |  | 4 |
| Normal Physical Properties |  |  |  |  |  |  |  |  |  |  |
| Tenile Strength | (MPa) | 20.2 | 19.7 | 19.5 | 19.3 | 18.7 | 21.2 | 21.0 | 22.1 | 21.4 |
| Elongation | (%) | 270 | 200 | 180 | 200 | 190 | 240 | 390 | 290 | 340 |
| Compression Set Test (O-ring) |  |  |  |  |  |  |  |  |  |  |
| Compression set | (%) | 39 | 33 | 26 | 32 | 26 | 22 | 54 | 81 | 82 |
| Cold Resistance Test |  |  |  |  |  |  |  |  |  |  |
| TR10 | (° C.) | −32 | −32 | −30 | −34 | −32 | −23 | −32 | −30 | −32 |
| Heat Aging Resistance Test |  |  |  |  |  |  |  |  |  |  |
| Hesat Change rate | (%) | −24 | −14 | −11 | −14 | −11 | −13 | −24 | −78 | −80 |

From Table 1, it can be seen that when a reactive silicone oil is blended into the carboxyl group-containing nitrile rubber (A-1), (A-2), or (A-3), while maintaining the normal physical properties (that is, while maintaining tensile strength and elongation at break at a good level), compression set resistance and cold resistance were excellent, the change rate in elongation after heat aging was small, and heat resistance was excellent (Examples 1 to 14).

On the other hand, from Table 2, it can be seen that when the reactive silicone oil is not blended, the affinity of the carboxyl group-containing nitrile rubber for silica is low, and as a result the heat resistance is poor (Comparative Examples 1 to 5). In particular, even when a silane coupling agent was used instead of the reactive silicone oil, the heat resistance was worse than in Examples 1 to 14 (Comparative Examples 2 to 5).

Further, even when the reactive silicone oil is blended, the affinity of the carboxyl group-containing nitrile rubber for silica is low in the case where the carboxyl group-containing nitrile rubber (A'-4) or (A'-7), which does not contain an α,β-ethylenically unsaturated monocarboxylic acid ester monomer unit, or the nitrile rubber (A'-5), which does not contain an α,β-ethylenically unsaturated monocarboxylic acid ester monomer unit, was used, and as a result, heat resistance was poor (Comparative Examples 6, 7, and 9).

In addition, even when the reactive silicone oil was blended, and the nitrile rubber (A'-6) which contains an α,β-ethylenically unsaturated monocarboxylic acid ester monomer unit was used, because the nitrile rubber (A'-6) did not contain a carboxyl group and had an iodine value of more than 120, compression set and heat resistance were both poor (Comparative Example 8).

The invention claimed is:

1. A nitrile rubber composition, comprising:
   a carboxyl group-containing nitrile rubber having an iodine value of 120 or less and containing 5 to 30% by weight of an α,β-ethylenically unsaturated nitrile monomer unit, 0.1 to 10% by weight of a carboxyl group-containing monomer unit, 15 to 60% by weight of an α,β-ethylenically unsaturated monocarboxylic acid ester monomer unit, and 20 to 64.9% by weight of a conjugated diene monomer unit;
   a reactive silicone oil; and
   silica, wherein
   the reactive silicone oil has a content ratio of 0.1 to 2 parts by weight with respect to 100 parts by weight of the carboxyl group-containing nitrile rubber,
   wherein the silica has a content ratio of 20 to 80 parts by weight with respect to 100 parts by weights of the carboxyl group-containing nitrile rubber; and
   wherein the reactive silicone oil is a compound represented by the following general formula (1):

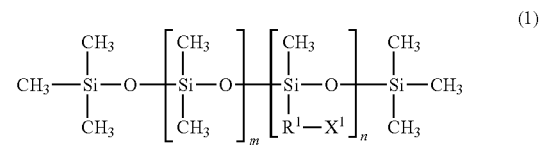

wherein, in the above formula (1), $R^1$ is a hydrocarbon group having 1 to 30 carbon atoms that may have a heteroatom in a main chain and/or a side chain; $X^1$ is a reactive group having an amino group; "m" is an integer of 1 to 10,000; and "n" is an integer of 1 to 10,000.

2. The nitrile rubber composition according to claim 1, wherein the reactive silicone oil has a content ratio of 1 to 2 parts by weight with respect to 100 parts by weight of the carboxyl group-containing nitrile rubber.

3. The nitrile rubber composition according claim 1, further comprising a polyamine cross-linking agent.

4. A cross-linked rubber obtained by cross-linking the nitrile rubber composition according to claim 1.

5. The cross-linked rubber according to claim 4 which is a seal material, a belt, a hose, or a gasket.

6. The nitrile rubber composition according to claim 1, wherein the carboxyl group-containing nitrile rubber has an iodine value of 60 or less and contains 8 to 27% by weight of the α,β-ethylenically unsaturated nitrile monomer unit, 1 to 9% by weight of the carboxyl group-containing monomer unit, 18 to 55% by weight of the α,β-ethylenically unsaturated monocarboxylic acid ester monomer unit, and 25 to 60% by weight of the conjugated diene monomer unit.

7. The nitrile rubber composition according to claim 1, wherein the carboxyl group-containing nitrile rubber has an iodine value of 40 or less and contains 10 to 25% by weight of the α,β-ethylenically unsaturated nitrile monomer unit, 2 to 8% by weight of the carboxyl group-containing monomer unit, 20 to 50% by weight of the α,β-ethylenically unsaturated monocarboxylic acid ester monomer unit, and 30 to 50% by weight of the conjugated diene monomer unit.

8. The nitrile rubber composition according to claim 1, wherein the carboxyl group-containing nitrile rubber has an iodine value of 30 or less and contains 15 to 24.5% by weight of the α,β-ethylenically unsaturated nitrile monomer unit, 3 to 7% by weight of the carboxyl group-containing monomer unit, 20 to 50% by weight of the α,β-ethylenically unsaturated monocarboxylic acid ester monomer unit, and 30 to 50% by weight of the conjugated diene monomer unit.

9. The nitrile rubber composition according to claim 1, wherein the carboxyl group-containing nitrile rubber has an iodine value of 15 or less and contains 15 to 24.5% by weight of the α,β-ethylenically unsaturated nitrile monomer unit, 3 to 7% by weight of the carboxyl group-containing monomer unit, 20 to 50% by weight of the α,β-ethylenically unsaturated monocarboxylic acid ester monomer unit, and 30 to 50% by weight of the conjugated diene monomer unit.

\* \* \* \* \*